Oct. 31, 1933.  E. P. DU PONT ET AL  1,933,101
VEHICLE CHASSIS MECHANISM
Filed Nov. 19, 1930    4 Sheets-Sheet 4
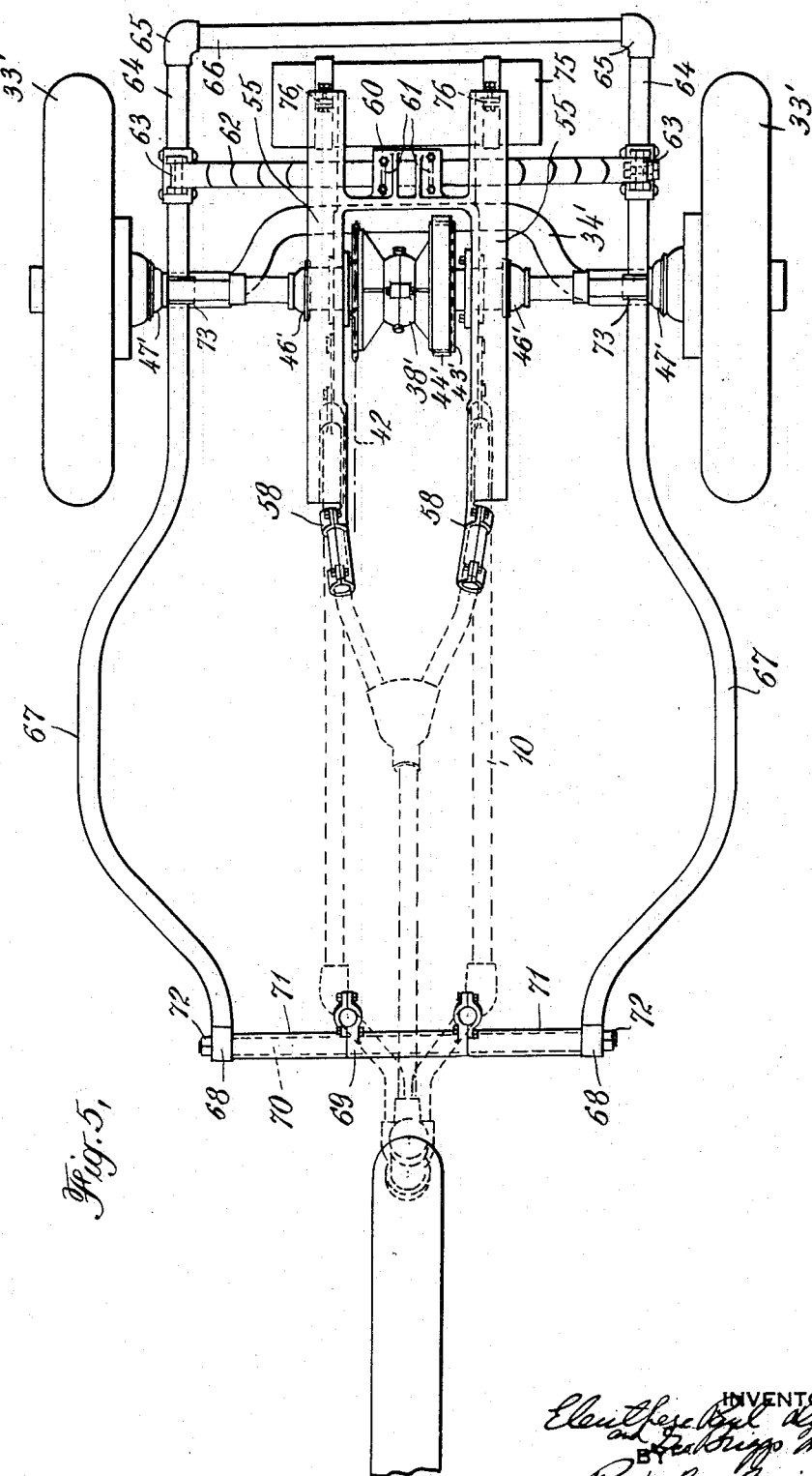

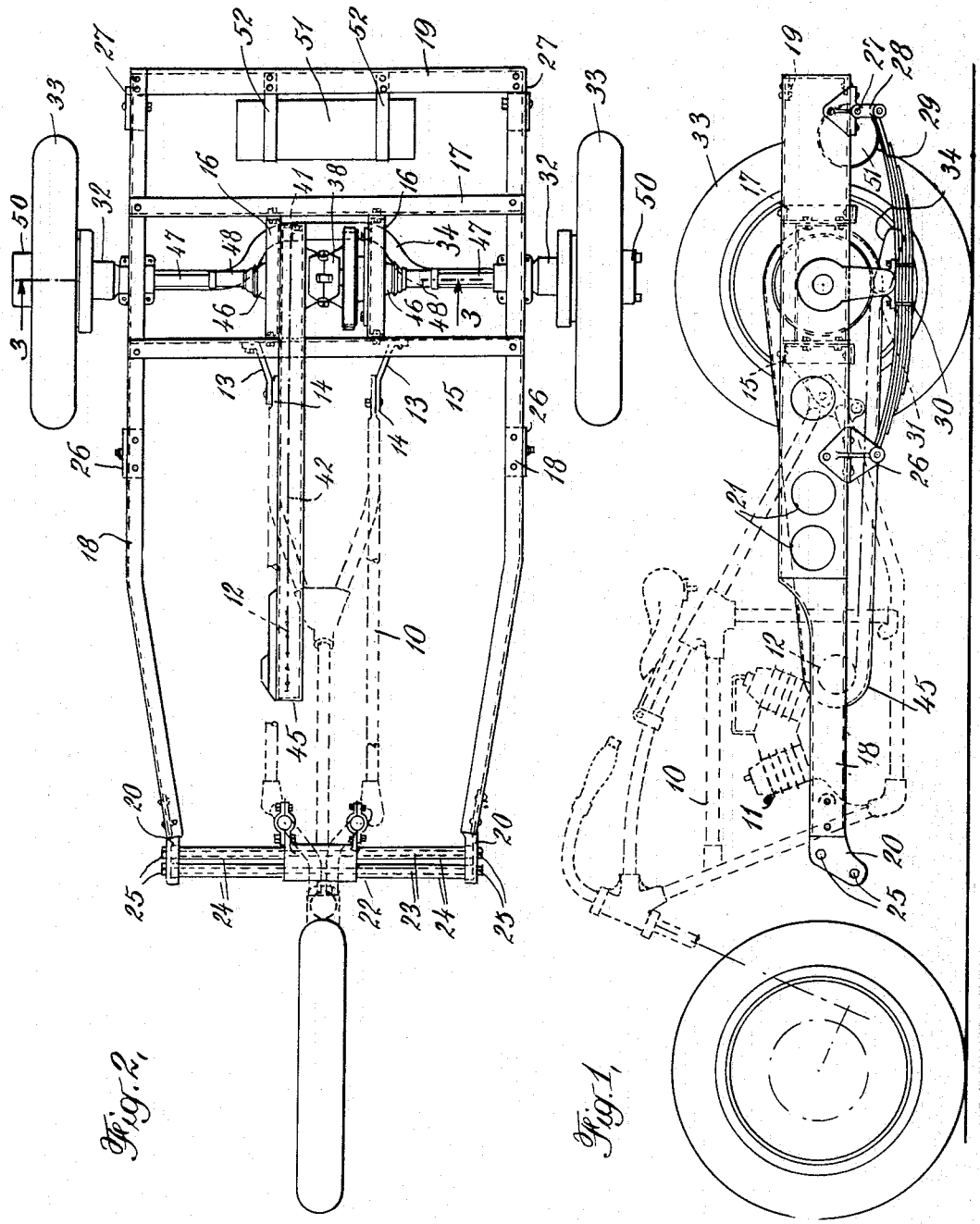

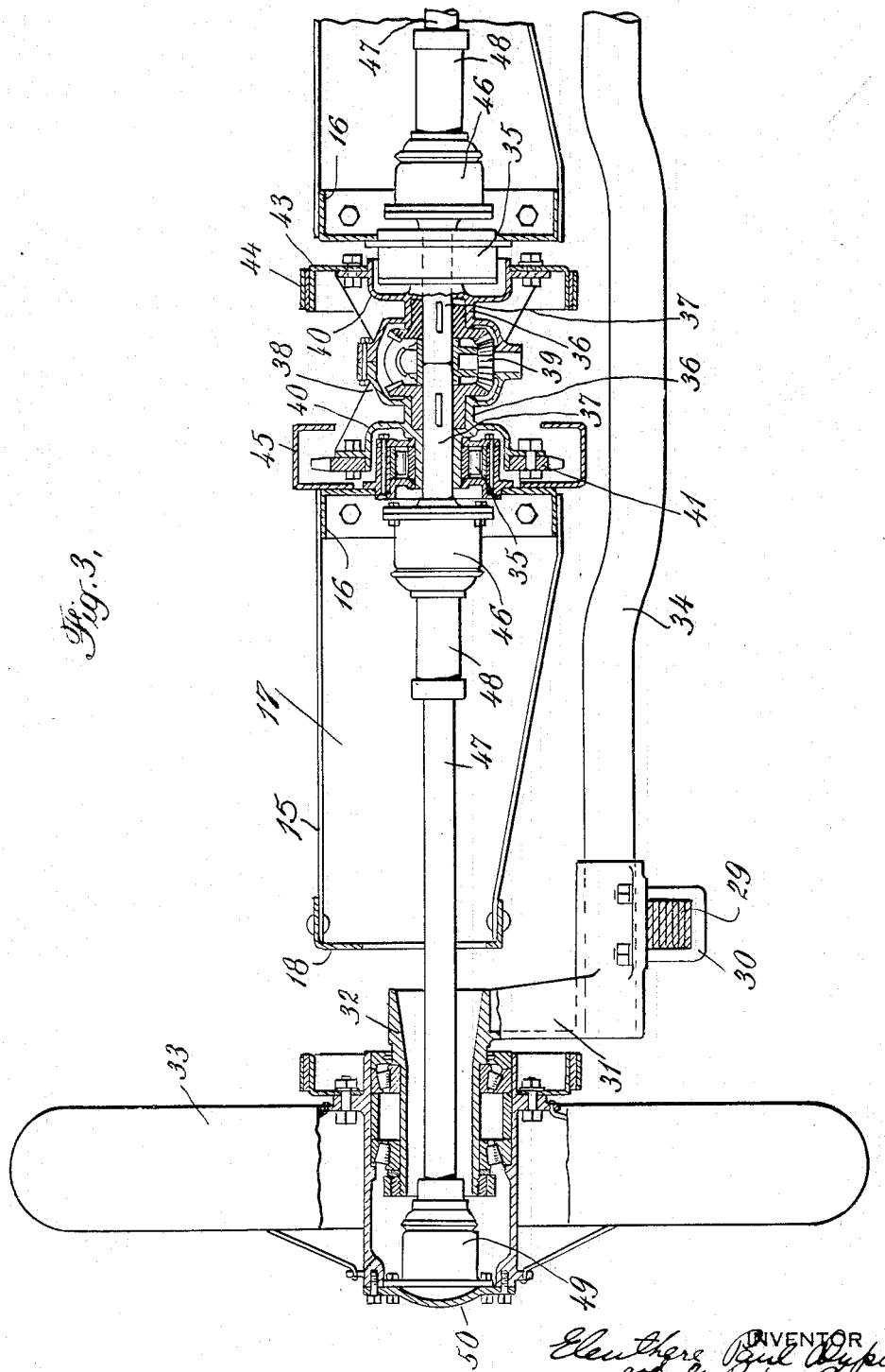

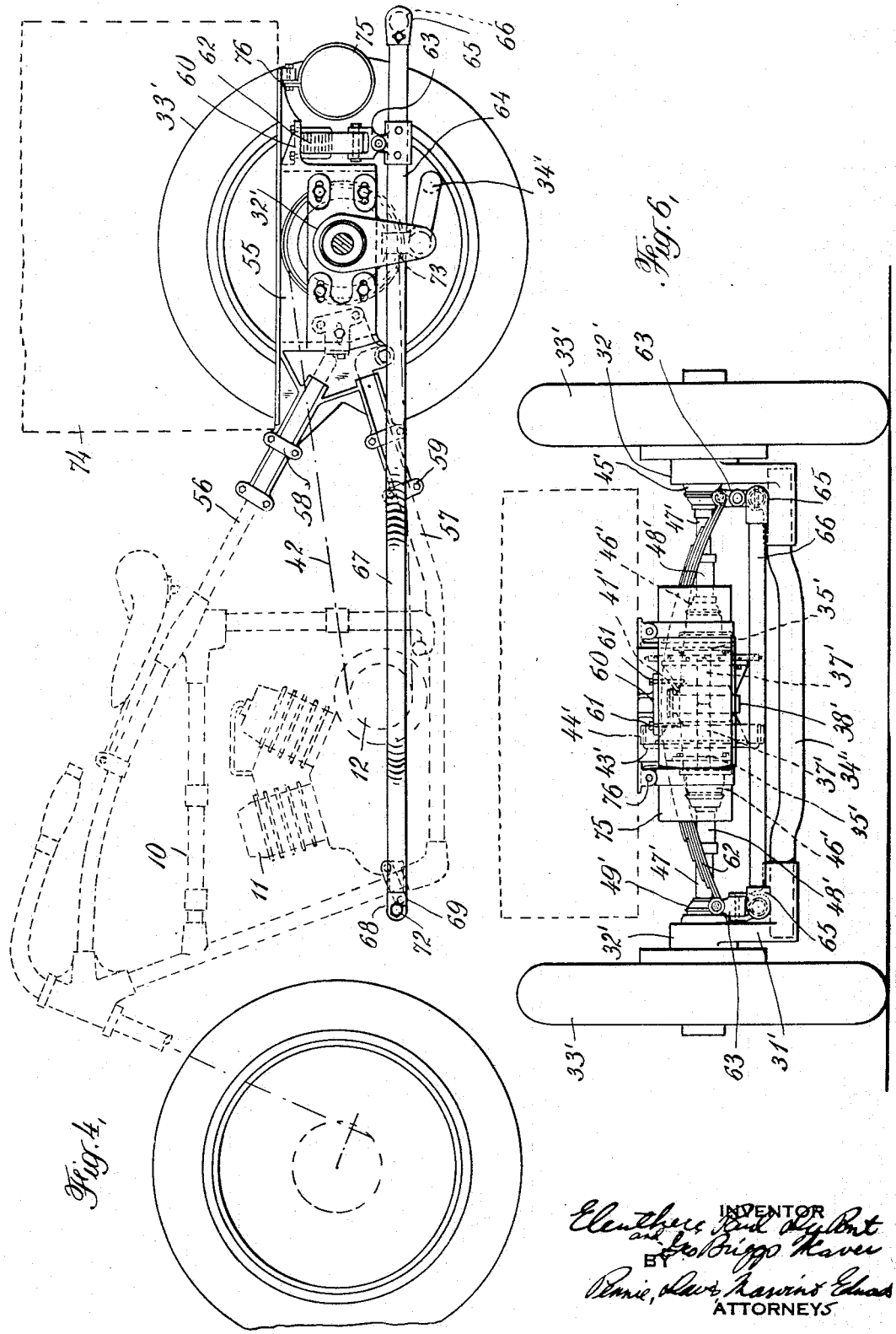

Patented Oct. 31, 1933

1,933,101

UNITED STATES PATENT OFFICE 1,933,101

VEHICLE CHASSIS MECHANISM

Eleuthere Paul du Pont, Wilmington, Del., and George Briggs Weaver, Springfield, Mass., assignors to Indian Motorcycle Company, Springfield, Mass., a corporation of Massachusetts Application November 19, 1930
Serial No. 496,591

17 Claims. (Cl. 180—25)

This invention relates to vehicle chassis mechanism and has particular reference to means for driving and rendering flexible a three-wheeled chassis formed jointly by a standard motorcycle frame and an attachment therefor adapted to be substituted for the rear wheel of the motorcycle.

It is the principal object of this invention to provide an attachment by means of which a standard motorcycle may be converted into a motor tricycle, which is flexible to compensate for road roughness and provide easy riding.

Another object of this invention is to provide a flexible driving mechanism for the rear wheels of the type of vehicle described, which may be mounted jointly on two relatively movable parts of the vehicle chassis or frame so as to accommodate and conform to the necessary movement between them in response to load variations and road roughness.

These and other objects of this invention are obtained in a preferred embodiment thereof comprising a member, which may be considered as the driving mechanism support, clamped to the rear fork of the motorcycle frame after the usual single rear wheel has been removed. Mounted on this rear member is the driving mechanism including a differential connecting two aligned stub axles, a differential brake, and a driving connection between the differential and the engine of the motorcycle, this driving connection being either the usual automobile propeller or torque shaft drive, or a chain and sprocket connection with the driving sprocket of the motorcycle engine. The latter is preferred for the reason that the engine sprocket may be used without change and the chain drive is efficient and inexpensive.

Rigidly secured to the member which is mounted on the rear fork of the motorcycle frame is the rear end of a chassis frame having spaced forward extensions passing along opposite sides of the motorcycle frame and whose front ends are rigidly secured to the front of the motorcycle frame, so that the chassis frame and the motorcycle frame form a single rigid unit.

Suspended from the rear end of the chassis frame adjacent the driving mechanism by means of springs is an axle support consisting of a pair of aligned axle housings and wheel journals connected by a beam which carries the aforementioned springs. Passing through these aligned axle housings and connected to the opposite wheels journalled thereon are the outer ends of the two stub axles, each of which is fitted with two universal joints which render them flexible to permit the desired relative vertical movement between the axle support and the chassis as the springs flex under load.

In an alternative arrangement of this invention, the chassis frame is connected to the motorcycle frame in the opposite way, that is to say, the chassis frame is mounted flexibly on the motorcycle frame instead of rigidly. In this arrangement a spring is interposed between the chassis frame and member which is clamped to the rear fork of the motorcycle frame, the axle support is rigidly secured to the chassis frame, and the forward extensions of the chassis frame are pivoted to the front of the motorcycle frame instead of being secured rigidly thereto. The driving mechanism is arranged as before, with the flexible shafts connecting the driving mechanism with the axle support to accommodate the relative movement between the driving mechanism supporting member and the axle support and chassis frame as the springs flex under load. In this arrangement the body is mounted on the member which is clamped to the rear fork of the vehicle, inasmuch as the chassis frame is flexible relatively to the motorcycle frame, whereas in the arrangement first described the body is mounted on the chassis frame as it is rigid relatively to the motorcycle frame.

It will be seen that the vehicle constructed in accordance with this invention is admirably suited for conveying passengers, merchandise, or the like, rapidly, economically, and easily, and that the particular flexible chassis and driving mechanism arrangement provides unusual smoothness and comfort in operation.

For a better understanding of this invention, reference is made to the accompanying drawings, in which Figure 1 is a side view of the vehicle chassis of this invention, the standard motorcycle frame which constitutes a portion thereof being shown in phantom;

Fig. 2 is a plan view thereof;

Fig. 3 is a section of a part of the driving and axle mechanism as seen along line 3—3 of Fig. 2; and Figs. 4, 5 and 6 are respectively side, plan, and rear views of a modified chassis arrangement of this invention.

In these drawings, numeral 10 designates the usual motorcycle frame mounting the engine 11 having the driving sprocket 12. Referring now particularly to the arrangement shown in Figs. 1 to 3, inclusive, a bracket 13 is clamped to each of the two journal plates 14 of the rear fork of the motorcycle frame. Bolted, riveted, or otherwise secured to these brackets 13 is a channel cross bar 15 which carries the flanged webs 16 to which in turn is secured a second cross bar 17, which is spaced parallelly from the first cross bar 15.

Secured to the outer ends of cross bars 15 and 17 are the channel side bars 18 whose rear ends are connected by channel 19, and whose extended front ends lie along opposite sides of the motorcycle frame and converge slightly at a point opposite the front of the latter. A double eye 20 is secured to the front end of each side bar 18 and lightening holes 21 pierce the side webs of the latter.

Clamped to the front of the motorcycle frame 10 is a bracket 22 having two cross-wise passages which align with the corresponding openings in the two double eyes 20 mounted on the front ends of the side bars 18. Inserted with a forced fit through the passages in bracket 22 is a pair of rods 23 whose outer ends pass through the openings of eyes 20 and are threaded. Properly spacing side bars 18 laterally from the motorcycle frame are a pair of spacers 24, which are lengths of pipe slipped over the ends of rods 23 so that the ends of these pipes 24 abut the bracket 22 and the eyes 20 on either side. Nuts 25 are tightened down on the threaded ends of rods 23 and a rigid chassis is formed, including the motorcycle frame 10 on which the unitary frame including parts 15 to 25, inclusive, is rigidly mounted.

Secured to the under side of each side bar 18 are the spring hangers 26 and 27, the latter having the spring shackle 28 to which one end of the semi-elliptic spring 29 is pivoted, while the other end of the spring 29 is pivoted in the other hanger 26. Secured by a clip 30 to the center of each spring 29 is an upstanding bracket 31 having the axle tube 32 upon which the wheel 33 is journalled. The brackets 31 are connected by an axle beam 34 which is bowed at the center as shown in Fig. 2 to prevent interference by the driving mechanism and its housings during operation of the vehicle. It will be seen that the brackets 31, axle tubes 32 and axle beam 34 form a unitary axle support which is movable relatively to the chassis frame as the springs 29 flex under load.

Referring now particularly to the driving mechanism shown by Fig. 3, it will be seen that a roller bearing 35 is secured in an aperture in each of the webs 16, and that a pair of sleeves 36 are journalled in these roller bearings 35, while the aligned axles 37 are in turn journalled in the sleeves 36. The two sleeves 36 are secured together and jointly form a differential housing 38 in the wall of which is journalled the idler pinion 39 of the differential gear. One of the other two differential gears 40 is keyed to each of the axles, so that rotation of the differential housing 38 produces rotation of the axles 37. Each of the sleeves 36 is provided with a flange 40, and to the right-hand sleeve flange 40 is bolted the sprocket 41 over which passes the drive chain 42 connected to the sprocket 12 of the motorcycle engine 11. A chain guard 45 secured to the right-hand web 16 houses the chain 42 and sprocket 41. The other or left-hand sleeve flange 40 carries a brake drum 43, whose rotation is braked by the usual brake band 44 by any suitable means such as a lever operable by the operator of the vehicle. This brake constitutes an emergency or parking brake and is operable independently of the rear wheel brakes in accordance with known practice.

Connected to the outer ends of each axle 37 is a universal joint 46 to which an axle extension 47 is connected through the slip collar 48, which allows for the necessary elongation of the axle extension 47 as it moves around the universal joint 46. The outer end of each axle extension 47 passes through axle tube 32 and is connected through a second universal joint 49 to the hubcap 50 of the corresponding wheel 33, so that the latter is rotated as the axle 37 and its extension 47 are driven through the differential from the motorcycle engine.

A body including either a cab having seats for passengers, a merchandise receptacle, a tool box, or any two of these or the like, is adapted to be mounted on the elevated platform behind the operator's saddle formed by the side bars 18, and cross bars 15, 17 and 19 connected thereto. A reserve fuel tank 51 may be attached by clips 52 to the rear channel 19 of the chassis frame, where it is in a convenient and accessible position for filling and draining.

In use, the motorcycle is operated in the usual way, and under load or when driving along rough roads or streets, the springs 29 flex and the rear end of the chassis moves upwardly and downwardly between the rear wheels 33, the universal joints 46 and 49 and slip collars 48 in the axle permitting the same to flex to permit this movement, whereby free and smooth riding is obtained.

A modified arrangement of the chassis mechanism of this invention is illustrated by Figs. 4, 5 and 6, in which a cast rear member 55, forming a platform, is secured to the rear upper strut 56 and rear lower strut 57 forming the rear fork of the motorcycle frame by means of clamps 58 and 59, respectively. This member 55 has integral rear lugs 60 to which is secured an inverted semi-elliptic spring 62 by spring clips 61. The ends of the spring 62 are connected by shackles 63 to side bars 64 of the chassis frame. These side bars may conveniently be tubing, and their ends are connected by elbows 65 to a rear cross tube 66. The side bars 64 are bowed at 67 to provide space between them for the operator of the vehicle, and their front ends are fitted with eyes 68 which register with the opening of a tubular clamp 69 secured to the front of the motorcycle frame 10. Inserted with a forced fit through tubular clamp 69 is a rod 70 whose ends are threaded and pass through eyes 68, and which carries spacer pipes 71 which properly space the side bars 64 from the motorcycle frame. A nut 72 is placed on the threaded end of rod 70 to complete this assembly, but side bars 64 are allowed a pivotal movement about rod 70 for a purpose to be described later.

Secured to side bars 64 by clamps 73 are the brackets 31' connected by the bowed axle beam 34' and having the axle tubes 32' which also serve as journals for rear wheels 33', exactly as described in connection with Figs. 1, 2 and 3, so that further description is not necessary. Likewise, the axles 37' are journalled in roller bearings 35' secured to the webs of member 55, and are connected by universal joints 46' and slip collars 48' to axle extensions 47', which in turn pass through axle tubes 32' and are connected by universal joints 49' to the wheels 33'. Also a differential in housing 38' connects the inner ends of axles 37' and is driven by a sprocket connected by chain 42 to the sprocket 12 of the motorcycle engine 11, and a brake drum 43' and its brake band 44' are arranged as illustrated in Fig. 3.

A body such as a cab, merchandise receptacle, tool box or the like 74 is adapted to be mounted on the platform formed by member 55, and a reserve fuel tank 75 may be secured by clips 76 to lugs on the rear end of member 55.

This completes the organization of the modified arrangement of this invention which differs from that illustrated by Figs. 1, 2 and 3 in that the chassis frame, instead of being rigidly connected to the motorcycle frame, is flexibly connected thereto. In operation, therefore, the rear end of the vehicle, i. e. member 55, body 74, and the rear end of the motorcycle frame move upwardly and downwardly between the rear wheels 33' as the spring 62 flexes under load or while traversing rough roads, and in order to accommodate this movement, the side bars 64 pivot about rod 70 and the axle flexes at the universal joints 46' and 49'.

This arrangement is exceptionally tight and strong and is admirably adapted for conveying one or two passengers, small articles of merchandise, and other relatively light loads, whereas the first arrangement, being more ruggedly constructed, is also adapted for heavier loads, although in general either arrangement may be used for the same purpose.

It will be seen that this invention provides a vehicle which is so flexible as to be usable under any and all operating conditions, especially under very severe circumstances where a less flexible vehicle would be liable to breakage due to sudden shocks and jars. This flexibility is a great advantage and does not detract from the ready handling, extreme mobility, lightness, and economy of operation which the vehicle also provides.

While a preferred embodiment of this invention has been illustrated and described herein, it is to be understood that the invention is in no wise limited thereby, but is susceptible of many changes in form and detail within its scope.

We claim:

1. An attachment for converting a motorcycle into a motor tricycle, comprising in combination a member adapted to be secured to the motorcycle frame, an axle support, an axle mounted jointly on said member and support, flexible connections between said member and said support, said axle being flexible to permit relative movement between said member and said support, opposite wheels on said axle for driving said rear wheels from the motorcycle engine.

2. An attachment for converting a motorcycle into a motor tricycle, comprising in combination a member adapted to be secured to the motorcycle frame, an axle support, an axle mounted jointly on said support and said member, flexible connections between said support and member permitting relative movement between them, and opposite wheels on said axle.

3. An attachment for converting a motorcycle into a motor tricycle, comprising in combination a member adapted to be secured to the motorcycle frame, an axle support, springs between said support and member permitting relative movement between them, an axle mounted jointly in said support and member, a universal joint in said axle to permit said relative movement, and opposite wheels on said axle.

4. An attachment for converting a motorcycle into a motor tricycle, comprising in combination a member adapted to be secured to the motorcycle frame, an axle support, oppositely extending stub axles journalled jointly in said support and member, wheels thereon, and a universal joint in each of said axles permitting relative movement between said support and member.

5. An attachment for converting a motorcycle into a motor tricycle, comprising in combination a member adapted to be secured to the motorcycle frame, an axle support, oppositely extending stub axles journalled jointly in said support, wheels thereon, springs between said support and member, and means permitting said axles to flex relatively to said support and member to allow relative movement between the latter when the springs flex.

6. An attachment for converting a motorcycle into a motor tricycle, comprising in combination a member adapted to be secured to the motorcycle frame, an axle support, oppositely extending axles journalled jointly in said support and member, driving connections between one of said axles and the motorcycle engine, and means permitting said axles to flex upon relative movement between said support and member.

7. An attachment for converting a motorcycle into a motor tricycle, comprising in combination a member adapted to be secured to the motorcycle frame, an axle support, oppositely extending axles journalled jointly in said support and member, wheels on their outer ends, flexible means at their inner ends including a driving connection from the motorcycle engine, and springs between said member and support permitting relative movement between them.

8. An attachment for converting a motorcycle into a motor tricycle, comprising in combination a member adapted to be secured to the motorcycle frame, an axle support, oppositely extending axles journalled jointly in said support and member, wheels on the outer ends of said shafts, gearing connecting the inner ends of said shafts, driving connections between said gearing and the motorcycle engine, springs between said support and member, and a universal joint in each of said axles permitting relative movement between said support and member when the springs flex under load.

9. An attachment for converting a motorcycle into a motor tricycle, comprising in combination a member adapted to be secured to the motorcycle frame, an axle support, oppositely extending axles journalled jointly in said support and member, wheels on the outer ends of said shafts, a differential connecting the inner ends of said shafts, a driving connection between said differential and the motorcycle engine, a pair of universal joints in each of said shafts and springs between said support and member permitting relative movement between them.

10. An attachment for converting a motorcycle into a motor tricycle, comprising in combination a member adapted to be secured to the rear end of the motorcycle frame, a chassis frame connected to the member at the rear end and having forward extensions connected to the front of the motorcycle frame, a flexible rear axle mounted on said chassis frame, opposite wheels thereon, a spring permitting movement of said wheels and axle relatively to said member, and a driving connection between said axle and the motorcycle engine.

11. An attachment for converting a motorcycle into a motor tricycle, comprising in combination a member adapted to be secured to the rear end of the motorcycle frame, a chassis frame secured to the front end of the motorcycle frame and connected at the rear to said member, an axle support connected to the chassis frame, a shaft journalled jointly in said axle support and member, opposite wheels on said axle, and a driving connection between said axle and the motorcycle engine.

12. An attachment for converting a motorcycle into a motor tricycle, comprising in combination a member adapted to be secured to the rear end of the motorcycle frame, a chassis frame secured to the front end of the motorcycle frame and connected at the rear to said member, an axle support connected to the chassis frame, a shaft mounted jointly in said support and member, a universal joint therein permitting relative movement between said support and member, opposite wheels on said axle, and means for driving at least one of said wheels from the motorcycle engine.

13. An attachment for converting a motorcycle into a motor tricycle, comprising in combination a member adapted to be secured to the rear end of the motorcycle frame, a chassis frame secured to the front end of the motorcycle frame and connected at the rear to said member, an axle support connected to the chassis frame, oppositely extending shafts mounted jointly in said support and member, opposite wheels on the outer ends of said axles, a differential between the inner ends of said axles, a driving connection between said differential and the motorcycle engine, and universal joints in said axles permitting relative movement between said member and support.

14. An attachment for converting a motorcycle into a motor tricycle, comprising in combination a chassis frame secured rigidly to the front and rear ends of the motorcycle frame, a rear axle support, springs mounting siad support upon said chassis frame, an axle mounted jointly on said chassis frame and support, a universal joint in said axle to permit relative movement between said support and chassis frame as said springs flex, and a driving connection between said axle and the motorcycle engine.

15. An attachment for converting a motorcycle into a motor tricycle, comprising in combination a chassis frame pivoted to the front of the motorcycle frame and extending rearwardly, a member secured to the rear of the motorcycle frame, a spring mounting said member on said chassis frame, an axle support mounted on said chassis frame adjacent said member, an axle mounted jointly in said support and member, a universal joint in said axle to permit relative movement between said member and chassis frame as said springs flex, and a driving connection between said axle and the motorcycle engine.

16. An attachment for converting a motorcycle into a motor tricycle, comprising in combination a chasis frame secured rigidly to the front and rear ends of the motorcycle frame, a rear axle support, springs mounting said support upon said chassis frame, an axle mounted jointly on said chassis frame and support, a plurality of universal joints in said axle to permit relative movement between said support and chassis, and a driving connection between said axle and the motorcycle engine.

17. An attachment for converting a motorcycle into a tricycle, comprising a chassis pivotally secured to the front end of the motorcycle frame, a member secured to the rear end of the frame, a spring between said member and the rear end of said chassis, permitting the latter to move up and down relatively to the motorcycle frame about its front pivot, an axle support mounted on the chassis, an axle mounted jointly on said member and said support, said axle having a flexible portion permitting relative movement between said chassis and said member as the spring flexes, driving connections between said axle and motorcycle engine, and opposite wheels on the axle.

ELEUTHERE PAUL du PONT.
GEO. BRIGGS WEAVER.